US 6,414,107 B1
Jul. 2, 2002

United States Patent
Zobel et al.

(54) POLYCARBONATE MOLDING MATERIALS EXHIBITING IMPROVED MECHANICAL PROPERTIES

(75) Inventors: Michael Zobel, Köln; Thomas Eckel, Dormagen; Dieter Wittmann, Leverkusen; Bernd Keller, Geldern, all of (DE)

(73) Assignee: Bayer Aktiengesellschaft, Leverkusan (DE)

( * ) Notice: Subject to any disclaimer, the term of this patent is extended or adjusted under 35 U.S.C. 154(b) by 0 days.

(21) Appl. No.: 09/857,273

(22) PCT Filed: Nov. 25, 1999

(86) PCT No.: PCT/EP99/09100

§ 371 (c)(1),
(2), (4) Date: Jun. 1, 2001

(87) PCT Pub. No.: WO00/34371

PCT Pub. Date: Jun. 15, 2000

(30) Foreign Application Priority Data

Dec. 8, 1998 (DE) .......................... 198 56 484

(51) Int. Cl.$^7$ .............................. C08G 64/00
(52) U.S. Cl. ........................ 528/196; 528/198
(58) Field of Search ................. 528/196, 198

(56) References Cited

U.S. PATENT DOCUMENTS 5,849,827 A  12/1998  Bödiger et al. ............. 521/423

FOREIGN PATENT DOCUMENTS

| EP | 0 066 772 | 12/1982 |
| EP | 0 755 977 | 1/1997 |

OTHER PUBLICATIONS

*Database WPI, Section Ch, Week 199807, Derwent Publications Ltd., London, GB: AN 1998–071966, XP002132320 & JP 09 310011 A (Nippon GE Plastics KK), Dec. 01, 1997.

*Database WPI, Section Ch, Week 199741, Derwent Publications Ltd., London, GB; AN 1997–448658, XP002132321 & WO 97 31980 A (Kaneka Corp.) Sep. 04, 1997.

*Primary Examiner*—Terressa M. Boykin
(74) *Attorney, Agent, or Firm*—Joseph C. Gil; Aron Preis; James R. Franks

(57) ABSTRACT

A thermoplastic polycarbonate molding composition is described. The thermoplastic composition contains a silicon compound, e.g., silicon dioxide, having an average particle diameter of 0.001 μm to 10 μm. The silicon compound is present in the composition in an amount of 0.01 to 30 parts by weight per 100 parts by weight of the thermoplastic polycarbonate. Also describe are shaped articles, e.g., data technology housing components, made from the thermoplastic polycarbonate composition of the present invention.

15 Claims, No Drawings

POLYCARBONATE MOLDING MATERIALS EXHIBITING IMPROVED MECHANICAL PROPERTIES

CROSS REFERENCE TO RELATED PATENT APPLICATIONS

The present patent application claims the right of priority under 35 U.S.C. §119 (a)–(d) and 35 U.S.C. §365 of International Application No. PCT/EP99/09100, filed Nov. 25, 1999, which was published in German as International Patent Publication No. WO 00/34371 on Jun. 15, 2000, which is entitled to the right of priority of German Patent Application No.198 56 484.8, filed Dec. 8, 1998.

FIELD OF THE INVENTION

The present invention relates to polycarbonate moulding compositions which comprise silicon compounds and have an increased heat distortion point, improved ESC properties and an improved elongation at break.

BACKGROUND OF THE INVENTION

Thermoplastic moulding compositions, in particular those which comprise homo-and/or copolymers of one or more ethylenically unsaturated monomers, polycarbonates and polyesters, are known from a large number of publications. This particularly applies to the use of ABS polymers. Reference is made to the following documents merely by way of example: DE-A 19616968, WO 97/40092, EP-A-728811, EP-A-315868 (=U.S. Pat. No. 4,937,285), EP-A 0174493 (U.S. Pat. No. 4,983,658), U.S. Pat. No. 5,030,675, JA 59202240, EP-A 0363608 (=U.S. Pat. No. 5,204,394), EP-A 0767204, EP-A 0611798, WO 96/27600 and EP-A 0754531.

EP-A 761 746 describes moulding compositions which are based on polycarbonate and optionally other thermoplastics and comprise very fine-particled inorganic powders and flameproofing agents. Silicon and silicon dioxide are also mentioned, in addition to a large number of very fine-particled inorganic compounds listed.

The thermoplastic moulding compositions described in this prior art are still in need of improvement in their mechanical properties. This particularly applies to the use of these moulding compositions in safety-relevant components, e.g. in the motor vehicle industry, where high requirements are imposed on elongation at break, ESC properties and heat distortion point.

SUMMARY OF THE INVENTION

Surprisingly, it has now been found that polycarbonate moulding compositions have improved ESC properties, a better elongation at break and an increased heat distortion point if silicon compounds of a particular size are added to them.

The invention accordingly provides a thermoplastic moulding composition comprising thermoplastic polycarbonate and 0.01 to 30 parts by wt. per 100 parts by wt. (polycarbonate) of silicon compounds having an average particle diameter of preferably 0.01–20 $\mu$m, particularly preferably 0.01–10 $\mu$m, particle diameters of 3–50 nm being especially preferred and those of 5–15 nm most preferred.

DETAILED DESCRIPTION OF THE INVENTION

The invention also provides thermoplastic moulding compositions comprising

A. 40 to 98 parts by wt., preferably 50 to 95 parts by wt., particularly preferably 60 to 90 parts by wt. of an aromatic polycarbonate, B. 0 to 50, preferably 1 to 30 parts by wt. of a vinyl (co)polymer of at least one monomer chosen from the series consisting of styrene, $\alpha$-methylstyrene, styrenes substituted on the nucleus, $C_1$–$C_8$-alkyl methacrylates and $C_1$–$C_8$-alkyl acrylates with at least one monomer from the series consisting of acrylonitrile, methacrylonitrile, $C_1$–$C_8$-alkyl methacrylates, $C_1$–$C_8$-alkyl acrylates, maleic anhydride and N-substituted maleimides, C. 0.5 to 60 parts by wt., preferably 1 to 40 parts by wt., particularly preferably 2 to 30 parts by wt. of a graft copolymer comprising at least two monomers from the group consisting of mono- or polyunsaturated olefins, such as e.g. ethylene, propylene, chloroprene, butadiene and isoprene, vinyl acetate, styrene, $\alpha$-methylstyrene, styrenes substituted on the nucleus, vinyl cyanides, such as e.g. acrylonitrile and methacrylonitrile, maleic anhydride and N-substituted maleimides, D. 0.01 to 30 parts by wt., preferably 0.1 to 20 parts by wt., particularly preferably 0.5 to 10 parts by wt. of silicon compounds having an average particle diameter of 0.01–20 $\mu$m, particularly preferably 0.01–10 $\mu$m, especially preferably 3–50 nm and most preferably 5–15 nm.

The moulding compositions according to the invention can fuirthermore comprise as additives (component E): conventional flameproofing agents, very fine-particled inorganic compounds or fluorinated polyolefins as anti-dripping agents and a mixture thereof The flameproofing agents and very fine-particled inorganic compounds are in general each used in an amount of 0.1 to 25, preferably 2 to 15 parts by wt. The fluorinated polyolefins are in general employed in an amount of 0.01 to 5, preferably 0.25 to 2 parts by wt.

The sum of all the parts by weight of A+B+C+D+E gives 100.

Component A

Thermoplastic aromatic polycarbonates according to component A which are suitable according to the invention are those based on diphenols of the formula (I)

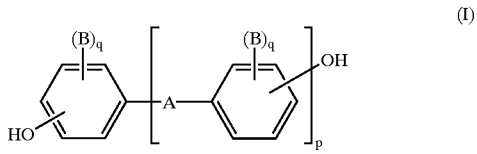

wherein

A is a single bond, $C_1$–$C_5$-alkylene, $C_2$–$C_5$-alkylidene, $C_5$–$C_6$-cycloalkylidene, —S— or —SO$_2$—, B is chlorine or bromine, q is 0, 1 or 2 and p is 1 or 0, or alkyl-substituted dihydroxyphenylcycloalkanes of the formula (II)

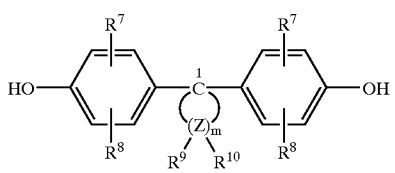

(II)

wherein
- $R^7$ and $R^8$ independently of one another each denote hydrogen, halogen, preferably chlorine or bromine, $C_1$–$C_8$-alkyl, $C_5$–$C_6$-cycloalkyl, $C_6$–$C_{10}$-aryl, preferably phenyl, and $C_7$–$C_{12}$-aralkyl, preferably phenyl-$C_1$–$C_4$-alkyl, in particular benzyl,
- m denotes an integer of 4, 5, 6 or 7, preferably 4 or 5,
- $R^9$ and $R^{10}$ can be chosen individually for each Z and independently of one another denote hydrogen or $C_1$–$C_6$-alkyl, and Z denotes carbon, with the proviso that on at least one atom Z $R^9$ and $R^{10}$ simultaneously denote alkyl.

Suitable diphenols of the formula (I) are e.g. hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-cloro-4-hydroxyphenyl)-propane and 2,2-bis-(3,5-dibromo-4-hydroxyphenyl)-propane.

Preferred diphenols of the formula (1) are 2,2-bis-(4-hydroxyphenyl)-propane, 2,2-bis-(3,5-dichloro-4-hydroxyphenyl)-propane and 1,1-bis-(4-hydroxyphenyl)-cyclohexane.

Preferred diphenols of the formula (I1) are 1,l-bis-(4-hydroxyphenyl)-3,3-dimethyl-cyclohexane, 1,1-bis-(4-hydroxyphenyl)-3,3,5-trimethylcyclohexane and 1,1-bis-(4-hydroxyphenyl)-2,4,4-trimethyl-cyclopentane.

Polycarbonates which are suitable according to the invention are both homopolycarbonates and copolycarbonates.

Component A can also be a mixture of the thermoplastic polycarbonates defined above.

Polycarbonates can be prepared in a known manner from diphenols with phosgene by the phase boundary process or with phosgene by the process in a homogeneous phase, the so-called pyridine process, it being possible for the molecular weight to be adjusted in a known manner by a corresponding amount of known chain stoppers.

Suitable chain stoppers are e.g. phenol, p-chlorophenol, p-tert-butylphenol or 2,4,6-tribromophenol, and also long-chain alkylphenols, such as 4-(1,3-tetramethylbutyl)-phenol, in accordance with DE-OS 2842005, or monoalkylphenols or dialkylphenols having a total of 8 to 20 C atoms in the alkyl substituents, in accordance with German Patent Application P 3506472.2, such as 3,5-di-tert-butylphenol, p-iso-octylphenol, p-tert-octylphenol, p-dodecylphenol and 2-(3, 5-dimethyl-heptyl)-phenol and 4-(3,5-dimethyl-heptyl)-phenol.

The amount of chain stoppers is in general between 0.5 and 10 mol %, based on the sum of the particular diphenols of the formulae (I) and/or (II) employed.

Polycarbonates A which are suitable according to the invention have average molecular weights ($\overline{M}_w$, weight-average, measured e.g. by ultracentrifugation or scattered light measurement) of 10,000 to 200,000, preferably-20,000 to 80,000.

Polycarbonates A which are suitable according to the invention can be branched in a known manner, and in particular preferably by incorporation of 0.05 to 2 mol %, based on the sum of the diphenols employed, of compounds which are trifimctional or more than trifunctional, e.g. those having three or more than three phenolic groups.

Preferred polycarbonates are, in addition to bisphenol A homopolycarbonate, the copolycarbonates of bisphenol A with up to 15 mol %, based on the molar sum of diphenols, of 2,2-bis-(3,5-dibromo-4-hydroxyphenyl)-propane and the copolycarbonates of bisphenol A with up to 60 mol %, based on the molar sum of diphenolsi of 1,1-bis-(4-hydroxyphenyl)-3,3,5-trimethylcyclohexane.

Polycarbonates A can be replaced in part or completely by aromatic polyester carbonates. The aromatic polycarbonates of component A can also contain polysiloxane blocks. The preparation thereof is described, for example, in DE-OS 3334872 and in U.S. Pat. No. 3,821,325.

Component B

Vinyl (co)polymers according to component B which can be employed according to the invention are those of at least one monomer from the series consisting of: styrene, α-methylstyrene and/or styrenes substituted on the nucleus, $C_1$–$C_8$-alkyl methacrylate and $C_1$–$C_8$-alkyl acrylate (B.1) with at least one monomer from the series consisting of: acrylonitrile, methacrylonitrile, $C_1$–$C_8$-alkyl methacrylate, $C_1$–$C_8$-alkyl acrylate, maleic anhydride and/or N-substituted maleimides (B.2).

$C_1$–$C_8$-Alkyl acrylates and $C_1$–$C_8$-alkyl methacrylates are esters of acrylic acid and methacrylic acid respectively and monohydric alcohols having 1 to 8 C atoms. Methyl, ethyl and propyl methacrylate are particularly preferred. Methyl methacrylate is mentioned as a particularly preferred methacrylic acid ester.

Thermoplastic (co)polymers having a composition according to component B can be formed as a by-product during the grafting polymerization for the preparation of component C, especially if large amounts of monomers are grafted on to small amounts of rubber. The amount of (co)polymer B to be employed according to the invention does not include these by-products of the grafting polymerization.

(Co)polymers according to component B are resinous, thermoplastic and rubber-free.

Thermoplastic (co)polymers B comprise 50 to 99, preferably 60 to 95 parts by wt. B.1 and 50 to 2, preferably 40 to 5 parts by wt. B.2.

Particularly preferred (co)polymers B are those of styrene with acrylonitrile and optionally with methyl methacrylate, of α-methylstyrene with acrylonitrile and optionally with methyl methacrylate, or of styrene and α-methylstyrene with acrylonitrile and optionally with methyl methacrylate.

The styrene/acrylonitrile copolymers according to component B are known and can be prepared by free-radical polymerization, in particular by emulsion, suspension, solution or bulk polymerization. The copolymers according to component B preferably have molecular weights $\overline{M}_w$ (weight-average, determined by light scattering or sedimentation) of between 15,000 and 200,000.

Particularly preferred copolymers B according to the invention are also randomly built-up copolymers of styrene and maleic anhydride, which can be prepared from the corresponding monomers by a continuous bulk or solution polymerization with incomplete conversions.

The contents of the two components of the randomly built-up styrene/maleic anhydride copolymers which are suitable according to the invention can be varied within wide limits. The preferred content of maleic anhydride is 5 to 25 wt. %.

The molecular weights (number-average $\overline{M}_n$) of the randomly built-up styrene/maleic anhydride copolymers according to component B which are suitable according to the invention can vary over a wide range. The range from 60,000 to 200,000 is preferred. A limiting viscosity of 0.3 to 0.9 (measured in dimethylformamide at 25° C.; in this context see Hoffinann, Krömer, Kuhn, Polymeranalytik I [Polymer Analysis I], Stuttgart 1977, page 316 et seq.) is preferred for these products.

Instead of styrene, vinyl (co)polymers B can also comprise styrenes which are substituted on the nucleus, such as p-methylstyrene, vinyltoluene and 2,4-dimethylstyrene, and other substituted styrenes, such as α-methylstyrene, which can optionally be halogenated (preferably with chlorine and/or bromine).

Component C

Graft polymers C comprise e.g. graft copolymers with rubber-elastic properties which are substantially obtainable from at least two of the following monomers: chloroprene, 1,3-butadiene, isoprene, styrene, acrylonitrile, ethylene, propylene, vinyl acetate and (meth)-acrylic acid esters having 1 to 18 C atoms in the alcohol component; that is to say polymers such as are described e.g. in "Methoden der Organischen Chemie [Methods of Organic Chemistry]" (Houben-Weyl), vol. 14/1, Georg Thieme-Verlag, Stuttgart 1961, p. 393–406 and in C. B. Bucknall, "Toughened Plastics", Appl. Science Publishers, London 1977. Preferred polymers C are partly crosslinked and have gel contents of more than 20 wt. %, preferably more than 40 wt. %, in particular more than 60 wt. %.

Preferred graft polymers C include graft polymers of:

C.1 5 to 95, preferably 30 to 80 parts by wt. of a mixture of

C.1.1 50 to 95 parts by wt. styrene, α-methylstyrene, styrene substituted on the nucleus by halogen or methyl, $C_1$–$C_8$-alkyl methacrylate, in particular methyl methacrylate, or $C_1$–$C_8$-alkyl acrylate, in particular methyl methacrylate, or mixtures of these compounds and C.1.2 5 to 50 parts by wt. acrylonitrile, methacrylonitrile, $C_1$–$C_8$-alkyl methacrylate, in particular methyl methacrylate, $C_1$–$C_8$-alkyl acrylate, in particular methyl acrylate, maleic anhydride or $C_1$–$C_4$-alkyl- or phenyl-N-substituted maleimides, or mixtures of these compounds, on C.2 5 to 95, preferably 20 to 70 parts by wt. polymer having a glass transition temperature below –10° C.

Preferred graft polymers C are e.g. polybutadienes, butadiene/styrene copolymers and acrylate rubbers grafted with styrene and/or acrylonitrile and/or (meth)acrylic acid alkyl esters; i.e. copolymers of the type described in DE-OS 1694173 (=U.S. Pat. No. 3,564,077); and polybutadienes or butadiene/styrene or butadiene/acrylonitrile copolymers, polyisobutenes or polyisoprenes grafted with acrylic or methacrylic acid alkyl esters, vinyl acetate, acrylonitrile, styrene and/or alkylstyrenes, such as are described e.g. in DE-OS 2348377 (=U.S. Pat. No. 3,919,353).

Particularly preferred polymers C are e.g. ABS polymers, such as are described e.g. in DE-OS 2035390 (=U.S. Pat. No. 3,644,574) or in DE-OS 2248242 (=GB-PS 1409275).

Particularly preferred graft polymers C are graft polymers which are obtainable by a grafting reaction of I. 10 to 70, preferably 15 to 50, in particular 20 to 40 wt. %, based on the graft product, of at least one (meth) acrylic acid ester or 10 to 70, preferably 15 to 50, in particular 20 to 40 wt. % of a mixture of 10 to 50, preferably 20 to 35 wt. %, based on the mixture, of acrylonitrile or (meth)acrylic acid ester and 50 to 90, preferably 65 to 80 wt. %, based on the mixture, of styrene on II. 30 to 90, preferably 50 to 85, in particular 60 to 80 wt. %, based on the graft product, of a butadiene polymer with at least 50 wt. %, based on II, of butadiene radicals as the graft base.

The gel content of graft base II is preferably at least 20 wt. %, particularly preferably at least 40 wt. % (measured in toluene), the degree of grafting G is 0.15 to 0.55 and the average particle diameter $d_{50}$ of the graft polymer is 0.05 to 2 μm, preferably 0.1 to 0.6 μm.

(Meth)acrylic acid esters I are esters of acrylic acid or methacrylic acid and monohydric alcohols having 1 to 18 C atoms. Methyl, ethyl and propyl methacrylate are particularly preferred.

In addition to butadiene radicals, graft base II can contain up to 50 wt. %, based on II, of radicals of other ethylenically unsaturated monomers, such as styrene, acrylonitrile, esters of acrylic or methacrylic acid having 1 to 4 C atoms in the alcohol component (such as methyl acrylate, ethyl acrylate, methyl methacrylate and ethyl methacrylate), vinyl esters and/or vinyl ethers. The preferred graft base II comprises pure polybutadiene.

The degree of grafting G designates the weight ratio of grafted-on grafting monomer to graft base and has no dimensions.

The average particle size $d_{50}$ is the diameter above and below which in each case 50 wt. % of the particles lie. It can be determined by means of ultracentrifige measurement (W. Scholtan, H. Lange, Kolloid, Z. und Z. Polymere 250 (1972), 782–796).

Particularly preferred polymers C are e.g. also graft polymers of (a) 20 to 90 wt. %, based on C, of acrylate rubber having a glass transition temperature below –20° C. as the graft base and (b) 10 to 80 wt. %, based on C, of at least one polymerizable ethylenically unsaturated monomer (cf. C.1) as the grafting monomer.

The acrylate rubbers (a) of polymers C are preferably polymers of acrylic acid alkyl esters, optionally with up to 40 wt. %, based on (a), of other polymerizable, ethylenically unsaturated monomers. Preferred polymerizable acrylic acid esters include $C_1$–$C_8$-alkyl esters, for example the methyl, ethyl, butyl, n-octyl and 2-ethylhexyl ester; halogenoallyl esters, preferably halogeno-$C_1$–$C_8$-alkyl esters, such as chloroethyl acrylate, and mixtures of these monomers.

For crosslinking, monomers having more than one polymerizable double bond can be copolymerized. Preferred examples of crosslinking monomers are esters of unsaturated monocarboxylic acids having 3 to 8 C atoms and unsaturated monohydric alcohols having 3 to 12 C atoms or saturated polyols having 2 to 4 OH groups and 2 to 20 C atoms, such as e.g. ethylene glycol dimethacrylate and allyl methacrylate; polyunsaturated heterocyclic compounds, such as e.g. trivinyl and triallyl cyanurate; polyfimctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which contain at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine and triallylbenzenes.

The amount of crossliniding monomers is preferably 0.02 to 5, in particular 0.05 to 2 wt. %, based on graft base (a).

With cyclic crosslinking monomers having at least 3 ethylenically unsaturated groups, it is advantageous to limit the amount to less than 1 wt. % of graft base (a).

Preferred "other" polymerizable, ethylenically unsaturated monomers which can optionally be used, in addition to the acrylic acid esters, for the preparation of graft base (a) are e.g. acrylonitrile, styrene, α-methylstyrene, acrylamides, vinyl $C_1$–$C_6$-alkyl ethers, methyl methacrylate and butadiene. Preferred acrylate rubbers as graft base (a) are emulsion polymers which have a gel content of at least 60 wt. %.

Further suitable graft bases are silicone rubbers with grafting-active positions such as are described in the Offenlegungsschriften DE-OS 3704657, DE-OS 3704655, DE-OS 3631540 and DE-OS 3631539.

The gel content of graft base (a) is determined at 25° C. in dimethylformamide (M.

Hoffmann, H. Krömer, R. Kuhn, Polymeranalytik I and II [Polymer Analysis I and II], Georg Thieme-Verlag, Stuttgart 1977).

Since as is known the grafting monomers are not necessarily grafted completely on to the graft base during the grafting reaction, according to the invention graft polymers C are also to be understood as those products which are obtained by polymerization of the grafting monomers in the presence of the graft base.

Component D

Compounds of silicon with at least one element chosen from the group consisting of metals of main groups 1 to 5, metals of sub-groups 1 to 8, carbon, nitrogen, phosphorus, oxygen, sulphur and halogens can be employed according to the invention.

Preferred compounds are silicon oxides, silicon hydroxides, water-containing silicon oxides, silicates, silicides, carbides, nitrides and sulfides.

Oxides of silicon are particularly preferred.

Oxides of silicon with a hydrophilic character are particularly preferred.

The particle size is preferably 0.01–20 μm, particularly preferably 0.01–10 μm, and particles diameter of 3–50 nm are especially preferred and those of 5–15 nm are most preferred.

Particle size and particle diameter always means the average particle diameter $d_{50}$, determined by ultracentrifuge measurements by the method of W. Scholtan et al. Kolloid-Z. und Z. Polymere 250 (1972), p. 782 to 796.

The inorganic compounds can be in the form of powders, pastes, sols, dispersions or suspensions. Powders can be obtained by precipitation from dispersions, sols or suspensions.

The powders can be incorporated into the thermoplastics by conventional processes, for example by direct kneading or extrusion of the constituents of the moulding composition and the very fine-particled inorganic powders. Preferred processes are the preparation of a masterbatch, e.g. in flameproofing additives, other additives, monomers, solvents or in component A, or co-precipitation of dispersions of components B or C with dispersions, suspensions, pastes or sols of the very fine-particled inorganic materials.

Component E

The moulding compositions according to the invention can in general comprise 0.1 to 25, preferably 2 to 15 parts by wt. of flameproofing agents. Flameproofing agents which are mentioned by way of example are organic halogen compounds, such as decabromobisphenyl ether and tetrabromobisphenol, inorganic halogen compounds, such as ammonium bromide, nitrogen compounds, such as melamine and melamine-formaldehyde resins, inorganic hydroxide compounds, such as Mg hydroxide and Al hydroxide, and inorganic compounds, such as aluminium oxides, titanium dioxides, antimony oxides, barium metaborate, hydroxoantimonate, zirconium oxide, zirconium hydroxide, molybdenum oxide, ammonium molybdate, tin borate, ammonium borate, barium metaborate and tin oxide, as well as siloxane compounds.

Phosphorus compounds such as are described in EP-A 363608, EP-A 345522 or EP-A 640655 can furthermore be employed as flameproofing compounds.

Such phosphorus compounds are, for example, phosphorus compounds of the formula (III)

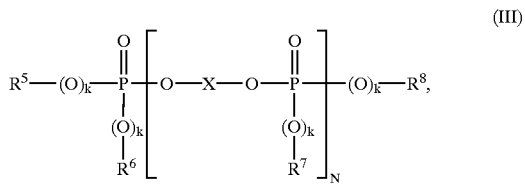

in which
R$^5$, R$^6$, R$^7$ and R$^8$ independently of one another each denote optionally halogenated $C_1$–$C_8$-alkyl, or $C_5$–$C_6$-cycloalkyl, $C_6$–$C_{30}$-aryl or $C_7$–$C_{12}$-aralkyl, in each case optionally substituted by alkyl, preferably $C_1$–$C_4$-alkyl, and/or halogen, preferably chlorine and bromine. Preferably, R$^5$, R$^6$, R7 and R$^8$, independently of one another represent $C_1$–$C_4$-alkyl, phenyl, naphthyl or phenyl-$C_1$–$C_4$-alkyl. The aromatic groups R$^5$, R$^6$, R$^7$ and R$^8$ can in their turn be substituted by halogen and/or alkyl groups, preferably chlorine, bromine and/or $C_1$–$C_4$-alkyl. Particularly preferred aryl radicals are cresyl, phenyl, xylenyl, propylphenyl or butylphenyl and the corresponding brominated and chlorinated derivatives thereof.

X in formula (III) denotes a mono- or polynuclear aromatic radical having 6 to 30 C atoms. This is preferably derived from diphenols of the formula (I). Diphenylphenol, bisphenol A, resorcinol or hydroquinone or chlorinated or brominated derivative thereof are particularly preferred.

k in formula (III) can, independently of one another, be 0 or 1, and k is preferably 1.

N represents values from 0 to 30, preferably 0 or an average value from 0.3 to 20, particularly preferably 0.5 to 10, in particular 0.5 to 6.

Mixtures of phosphorus compounds of the formula (III) preferably comprise 10 to 90 wt. %, preferably 12 to 40 wt. % of at least one monophosphorus compound and at least one oligomeric phosphorus compound, or a mixture of oligomeric phosphorus compounds, in amounts of 10 to 90 wt. %, preferably 60 to 88 wt. %, based on the total amount of phosphorus compounds.

Monophosphorus compounds of the formula (III) are, in particular, tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, halogen-substituted aryl phosphates, methylphosphonic acid dimethyl ester, methylphosphonic acid diphenyl ester, phenylphosphonic acid diethyl ester, triphenylphosphine oxide or tricresylphosphine oxide.

The mixtures of monomers and oligomeric phosphorous compounds of the formula (III) have average N values of 0.3 to 20, preferably 0.5 to 10, in particular 0.5 to 6.

The phosphorus compounds according to formula (III) are known (cf. e.g. EP-A 363608, EP-A 640655 and EP-A 542522) or can be prepared by known methods in an analogous manner (e.g. Ullmanns Enzyklopädie der technischen Chemie [Ullmann's Encyclopaedia of Industrial Chemistry], vol. 18, p. 301 et seq. 1979; Houben-Weyl, Methoden der Organischen Chemie [Methods of Organic Chemistry], vol. 12/1, p. 43; Beilstein vol. 6, p. 177).

Further phosphorus-containing compounds which can be employed as flameproofing agents are linear phosphazenes according to formula (IIIa) and cyclic phosphazenes according to formula (IIIb).

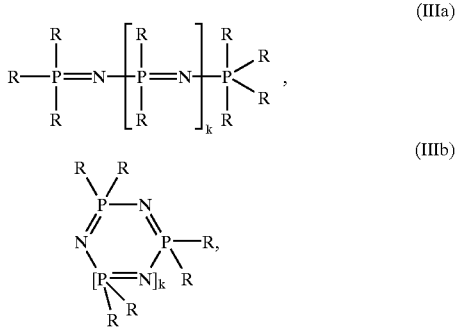

wherein:
R is in each case identical or different and represents amino, $C_1$- to $C_8$-allyl or $C_1$- to $C_8$-alkoxy, in each case optionally halogenated, preferably halogenated with fluorine, or $C_5$- to $C_6$-cycloalkyl, $C_6$- to $C_{20}$-aryl, preferably phenyl or naphthyl, $C_6$- to $C_{20}$-aryloxy, preferably phenoxy or naphthyloxy, or $C_7$- to $C_{12}$-aralkyl, preferably phenyl-$C_1$-$C_4$-alkyl, in each case optionally substituted by alkyl, preferably $C_1$-$C_4$-alkyl, and/or halogen, preferably chlorine and/or bromine,
k represents 0 or a number from 1 to 15, preferably a number from 1 to 10.

As examples there may be mentioned:
propoxyphosphazene, phenoxyphosphazene, methylphenoxyphosphazene, aminophosphazene and fluoroalkylphosphazenes. Phenoxyphosphazene is preferred.

The phosphazenes can be employed by themselves or as a mixture. The radical R can always be identical, or 2 or more radicals in the formulae (IIIa) and (IIIb) can be different.

The phosphazenes and their preparation are described, for example, in EP-A 728811, DE-A 1961668 and WO 97/40092.

The moulding compositions according to the invention can optionally comprise flameproofing agents which differ from compounds of the formula (III), (IIIa) and (IIIb) in an amount of up to 20 parts by wt. Flameproofing agents which have a synergistic action are preferred. Further flameproofing agents which are mentioned by way of example are organic halogen compounds, such as decabromobisphenyl ether and tetrabromobisphenol, inorganic halogen compounds, such as ammonium bromide, nitrogen compounds, such as melamine and melamine-formaldehyde resins, or siloxane compounds. The moulding compositions according to the invention can optionally comprise inorganic substances which deviate from the inorganic compounds D, such as, for example, inorganic hydroxide compounds, such as Mg hydroxide and Al hydroxide, and inorganic compounds such as aluminium oxide, antimony oxides, barium metaborate, hydroxoantimonate, zirconium oxide, zirconium hydroxide, molybdenum oxide, ammonium molybdate, zinc borate, ammonium borate, barium metaborate and tin oxide.

Preferred flameproofing agents are chosen from phosphorus compounds of the formulae (III), (IIIa) and (IIIb) or mixtures thereof. Phosphorus compounds of the formula (III) are particularly preferred. The thermoplastic moulding compositions according to the invention can furthermore comprise very fine-particled inorganic compounds which have a favourable effect on the flameproofing properties of the moulding compositions according to the invention. These inorganic compounds include compounds of one or more metals of main groups 1 to 5 or sub-groups 1 to 8 of the periodic table, preferably main groups 2 to 5 or sub-groups 4 to 8, particularly preferably main groups 3 to 5 or sub-groups 4 to 8, with the elements oxygen, sulphur, boron, phosphorus, carbon, nitrogen, hydrogen and/or silicon, the silicon compounds differing from those according to component D).

Preferred compounds are, for example, oxides, hydroxides, water-containing oxides, sulfates, sulfites, sulfides, carbonate, carbides, nitrates, nitrites, nitrides, borates, silicates, phosphates, hydrides, phosphites or phosphonates.

Preferred very fine-particled inorganic compounds are, for example, TiN, TiO, $SnO_2$, WC, ZnO, $Al_2O_3$, AlO(OH), $ZrO_2$, $Sb_2O_3$, iron oxides, $NaSO_4$, $BaSO_4$, vanadium oxides, zinc borate and silicates, such as Al silicates, Mg silicates and one-, two- and three-imensional silicates. Mixtures and doped compounds can also be used. Furthermore, the nanoscale particles can also be surface-modified with organic molecules in order to achieve a better compatibility with the polymers. Hydrophobic or hydrophilic surfaces can be generated in this manner.

The average particle diameters are less than 200 mn, preferably less than 150 nm, in particular 1 to 100 nm.

Particle size and particle diameter always means the average particle diameter $d_{50}$, determined by ultracentrifuge measurements by the method of W. Scholtan et al. Kolloid-Z. und Z. Polymere 250 (1972), p. 782 to 796.

The inorganic compounds can be in the form of powders, pastes, sols, dispersions or suspensions. Powders can be obtained by precipitation from dispersions, sols or suspensions.

The powders can be incorporated into the thermoplastics by conventional processes, for example by direct kneading or extrusion of the constituents of the moulding composition and the very fine-particled inorganic powders. Preferred processes are the preparation of a masterbatch, e.g. in flameproofing additives, other additives, monomers, solvents or in component A, or coprecipitation of dispersions of components B or C with dispersions, suspensions, pastes or sols of the very fine-particled inorganic materials.

Fluorinated polyolefins can furthermore be added. The fluorinated polyolefins are of high molecular weight and have glass transition temperatures above −30° C., as a rule above 100° C., fluorine contents preferably of 65 to 76, in particular 70 to 76 wt. %, and average particle diameters $d_{50}$ of 0.05 to 1,000, preferably 0.08 to 20 μm. In general, the fluorinated polyolefins have a density of 1.2 to 2.3 g/cm$^3$.

Preferred fluorinated polyolefins are polytetrafluoroethylene, polyvinylidene fluoride and tetrafluoroethylene/hexafluoropropylene and ethylene/tetrafluoroethylene copolymers.

The fluorinated polyolefins are known (cf. "Vinyl and Related Polymers" by Schildknecht, John Wiley & Sons, Inc., New York, 1962, page 484 to 494; "Fluoropolymers" by Wall, Wiley-Interscience, John Wiley & Sons, Inc., New York, volume 13, 1970, page 623 to 654; "Modern Plastics Encyclopaedia", 1970 to 1971, volume 47, no. 10A, October 1970, McGraw-Hill, Inc., New York, page 134 and 774; "Modem Plastics Encyclopaedia", 1975 to 1976, October 1975, volume 52, no. 10A, McGraw-Hill, Inc., New York, page 27, 28 and 472 and U.S. Pat. No. 3,671,487, 3,723,373 and 338092).

They can be prepared by known processes, thus, for example, by polymerization of tetrafluoroethylene in an aqueous medium with a catalyst which forms free radicals, for example sodium peroxydisulfate, potassium peroxydisulfate or ammonium peroxydisulfate, under pressers of 7 to 71 kg/cm$^2$ and at temperatures of 0 to 200° C., preferably at temperatures of 20 to 100° C. (For further details see e.g. U.S. Pat. No. 2,393,967). The density of these materials can be between 1.2 and 2.3 gtcm$^3$ and the average particle size between 0.05 and 1,000 nm, depending on the use form.

Fluorinated polyolefins which are preferred according to the invention are tetrafluoroethylene polymers and have average particle diameters of 0.05 to 20 $\mu$m, preferably 0.08 to 10 $\mu$m, and a density of 1.2 to 1.9 g/cm$^3$. They are preferably employed in the form of a coagulated mixture of emulsions of the tetrafluoroethylene polymers with emulsions of graft polymers C.

Suitable fluorinated polyolefins which can be employed in powder form are tetrafluoroethylene polymers having average particle diameters of 100 to 1,000 $\mu$m and densities of 2.0 g/cm$^3$ to 2.3 g/cm$^3$.

To prepare a coagulated mixture of C and the fluorinated polyolefin, an aqueous emulsion (latex) of a graft polymer C having average latex particle diameters of 0.05 to 2 $\mu$m, in particular 0.1 to 0.6 $\mu$m, is first mixed with a fine-particled emulsion of a fluorinated polyolefin in water having average particle diameters of 0.05 to 20 $\mu$m, in particular 0.08 to 10 $\mu$m; suitable tetrafluoroethylene polymer emulsions conventionally have solids contents of 30 to 70 wt. %, in particular 50 to 60 wt. %.

The aqueous emulsion of graft polymer C has solids contents of 25 to 60 wt. %, preferably 30 to 45 wt. %, in particular 30 to 35 wt. %.

The amount stated in the description for component C does not include the content of graft polymer in the coagulated mixture of graft polymer and fluorinated polyolefins.

The weight ratio of graft polymer C to fluorinated polyolefin in the emulsion mixture is 95:5 to 60:40. The emulsion mixture is coagulated in a known manner, for example by spray drying, freeze drying or coagulation by means of addition of inorganic or organic salts, acids or bases or organic water-miscible solvents, such as alcohols and ketones, preferably at temperature of 20 to 150° C., in particular 50 to 100° C. If necessary, drying can be carried out at 50 to 200° C., preferably 70 to 100° C.

Suitable tetrafluoroethylene polymer emulsions are commercially available products and are available, for example, from DuPont as Teflon® 30 N.

The moulding compositions according to the invention can furthermore comprise conventional additives, such as antidripping agents (differing from E), lubricants and mould release agents, nucleating agents, antistatics, stabilizers, fillers and reinforcing substances and dyestuffs and pigments.

Suitable filler and reinforcing materials are, for example, glass fibres, optionally cut or ground, glass beads, glass balls, reinforcing materials in platelet form, such as kaolin, talc, glimmerite, silicates, quartz, talc, titanium dioxide, wollastonite, mica, carbon fibres or mixtures thereof. Cut or ground glass fibres are preferably employed as the reinforcing material. Preferred fillers, which can also have a reinforcing action, are glass beads, mica, silicates, quartz, talc, titanium dioxide and wollastonite.

The moulding compositions with a filler or reinforcing material content can comprise up to 60, preferably 10 to 40 wt. %, based on the moulding composition with a filler or reinforcing material content, of fillers and/or reinforcing substances.

The moulding compositions according to the invention comprising components A to E and optionally further additives are prepared by mixing the particular constituents in a known manner and subjecting the mixture to melt compounding or melt extrusion at temperatures of 200° C. to 300° C. in conventional units, such as internal kneaders, extruders and twin-screw extruders, the fluorinated polyolefins preferably being employed in the form of the coagulated mixture already mentioned.

The individual constituents can be mixed in a known manner both successively and simultaneously, and in particular both at about 20° C. (room temperature) and at a higher temperature.

The moulding compositions of the present invention can be used for the production of all types of shaped articles. In particular, shaped articles can be produced by injection moulding. Examples of shaped articles which can be produced are: housing components of all types, e.g. for domestic appliances, such as juice presses, coffee machines and mixers, or for office machines, such as computers, printers and monitors, or covering sheets for the building sector and components for the motor vehicle sector. They are moreover employed in the field of electrical engineering, because they have very good electrical properties.

The moulding compositions are particularly suitable for the production of thin-walled mouldings (e.g. data technology housing components), where particularly high requirements are imposed on the notched impact strength and stress-craclding resistance of the plastics employed.

Another form of processing is the production of shaped articles by blow moulding or by thermoforming from previously produced sheets or films.

EXAMPLES

Component A

Polycarbonate based on bisphenol A with a relative solution viscosity of 1,252, measured in methylene chloride at 25° C. and in a concentration of 0.5 g/100 ml.

Component B

Styrene/acrylonitrile copolymer with a styrene/acrylonitrile ratio of 72:28 and a limiting viscosity of 0.55 dl/g (measurement in dimethylformamide at 20° C.).

Component C

Graft polymer of 40 parts by wt. styrene and acrylonitrile in a ratio of 73:27 on 60 parts by wt. crosslinked polybutadiene rubber in particle form (average particle diameter $d_{50}$=0.3 $\mu$m), prepared by emulsion polymerization.

Component D

Silicon dioxide is employed as the very fine-particled inorganic compound, e.g. in the form of Aerosil 300 (D.1, hydrophilic) or Aerosil R812 (D.2, hydrophobic). The average particle size of the material is approx. 7 nm.

Component E
The flameproofing agent employed is component E.1:

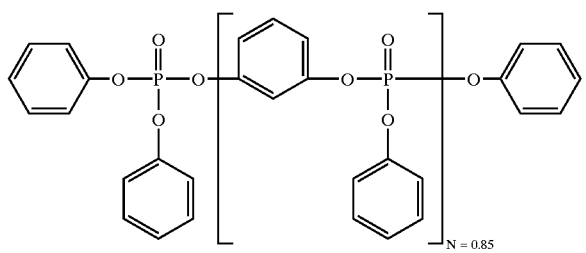

Tetrafluoroethylene polymer (component E.2) is employed as a coagulated mixture of an SAN graft polymer emulsion according to component C in water and a tetrafluoroethylene polymer emulsion in water. The weight ratio of graft polymer C to tetrafluoroethylene polymer E.2 in the mixture is 90 wt. % to 10 wt. %. The tetrafluoroethylene polymer emulsion has a solids content of 60 wt. %, and the average particle diameter is between 0.05 and 0.5 $\mu$m. The SAN graft polymer emulsion has a solids content of 34 wt. % and an average latex particle diameter of 0.4 $\mu$m.

Preparation of E.2:

The emulsion of the tetrafluoroethylene polymer (Teflon 30 N from DuPont) is mixed with the emulsion of the SAN graft polymer C and the mixture is stabilized with 1.8 wt. %, based on the polymer solid, of phenolic antioxidants. The mixture is filtered with an aqueous solution of MgSO$_4$ (Epsom salt) and acetic acid at pH 4 to 5 at 85 to 95° C., filtered, washed until practically free from electrolytes, subsequently freed from most of the water by centrifuigation and then dried at 100° C. to give a powder. This powder can then be compounded together with the flameproofing agent (component E.1) and with the further components in the units described.

Preparation and Testing of the Moulding
Compositions According to the Invention

The components are mixed on a 3 1 internal kneader. The shaped articles are produced on an injection moulding machine type Arburg 270E at 260° C.

The stress cracking properties are investigated on bars of dimensions 80×10×4 mm, material temperature 260° C. A mixture of 60 vol. % toluene and 40 vol. % isopropanol is used as the test medium. The test specimens are pre-extended by means of an arc-shaped template (pre-extension 1.2 to 2.4%) and kept in the test medium at room temperature. The stress cracking properties are evaluated via the cracking as a function of the pre-extension or the fracture as a function of the exposure time in the test medium.

The elongation at break BR is determined in the context of the determination of the tensile E modulus in accordance with the method of ISO 527 on F3 dumbbell bars.

The Vicat B heat distortion point is determined in accordance with DIN 53460 or ISO 306.

The composition of the materials tested and the data obtained are summarized in the following table 1.

TABLE 1

| Examples | 1 (Comparison) | 2 | 3 |
|---|---|---|---|
| Components: [%] | | | |
| A | 68.4 | 67.9 | 67.9 |
| B | 9.3 | 9.2 | 9.2 |
| C | 6.8 | 6.8 | 6.8 |
| D.1 | — | 0.75 | — |
| D.2 | — | — | 0.75 |
| E.1 | 10.8 | 10.8 | 10.8 |
| E.2 | 4.2 | 4.2 | 4.2 |
| Additives | 0.5 | 0.35 | 0.35 |
| Properties: | | | |
| Vicat B 120 [° C.] | 93 | 95 | 97 |
| ESC properties pre-extension 0.8%/5 min | BR | no BR | no BR |
| ESC properties pre-extension 1.8%/5 min | BR | BR | BR |
| Elongation at break [%] | 35.2 | 73.2 | 58.2 |

BR = break

It can be seen that SiO$_2$ improves the elongation at break, the Vicat and the ESC properties, the elongation at break being particularly greatly improved in particular when hydrophilic SiO$_2$ (component D.1) is used.

What is claimed is:

1. A thermoplastic molding composition comprising,
   (i) thermoplastic polycarbonate, and
   (ii) 0.01 to 30 parts by wt., per 100 parts by wt. of thermoplastic polycarbonate (i), of a silicon compound having an average particle diameter of 0.001 $\mu$m to 10 $\mu$m.

2. The thermoplastic molding composition of claim 1 wherein the average particle diameter of the silicon compound is 3 to 50 nm.

3. The thermoplastic molding composition of claim 1 wherein the average particle diameter of the silicon compound is 5 to 15 nm.

4. The thermoplastic molding composition of claim 1 wherein said silicon compound is a hydrophilic silicon compound.

5. The thermoplastic molding composition of claim 1 wherein said silicon compound is an oxide of silicon.

6. The thermoplastic molding composition of claim 1 comprising,
   A. 40 to 99 parts by wt. of an aromatic polycarbonate,
   B. 0 to 50 parts by wt. of a vinyl copolymer,
   C. 0.5 to 60 parts by wt. of a graft polymer, and
   D. 0.1 to 30 parts by wt. of said silicon compound.

7. The thermoplastic molding composition of claim 6, further comprising at least one of flameproofing agents, very fine-particled organic compounds and fluorinated polyolefins.

8. The thermoplastic molding composition of claim 6, comprising 50 to 95 parts by wt. of said aromatic polycarbonate A.

9. The thermoplastic molding composition of claim 6, wherein said graft polymer C is prepared by copolymerization of:
   (a) 5 to 95 parts by wt. of a mixture of,
      (i) 50 to 95 parts by wt. of at least one of styrene, α-methylstyrene, styrene substituted on the nucleus by halogen or alkyl, $C_1$–$C_8$-alkyl methacrylate and $C_1$–$C_8$-alkyl acrylate, and
      (ii) 5 to 50 parts by wt. of at least one of acrylonitrile, methacrylonitrile, $C_1$–$C_8$-alkyl methacrylate, $C_1$–$C_8$-alkyl acrylate, maleic anhydride and $C_1$–$C_4$-alkyl or phenyl-N-substituted maleimide; and
   (b) 5 to 95 parts by wt. rubber having a glass transition temperature below –10° C.

10. The thermoplastic molding composition of claim 5 further comprising phosphorus compounds as flameproofing agents.

11. The thermoplastic molding composition of claim 10 wherein said phosphorous compound is represented by the following formula (III),

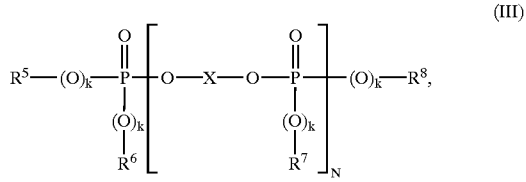

in which $R^5$, $R^6$, $R^7$ and $R^8$ independently of one another in each case denote at least one of optionally halogenated $C_1$–$C_8$-alkyl, $C_5$–$C_6$-cycloalkyl, $C_6$–$C_{30}$-aryl, $C_7$–$C_{12}$-aralkyl, in each case optionally substituted by at least one of $C_1$–$C_4$-alkyl, and halogen, k independently of one another denotes 0 or 1, N denotes 0 to 30, and X denotes a mono- or polynuclear aromatic radical having 6 to 30 C atoms.

12. The thermoplastic molding composition of claim 11 further comprising 0.01 to 20 wt. %, based on the total molding composition, of at least one further flameproofing agent which differs from formula (III).

13. The thermoplastic molding composition of claim 1, further comprising at least one additive selected from the group consisting of stabilizers, pigments, mould release agents, flow auxiliaries and antistatics.

14. A method of using the composition of claim 1 comprising molding a shaped article therefrom.

15. The shaped article produced by the method of claim 14.

* * * * *